(12) United States Patent
Takayanagi

(10) Patent No.: US 7,161,503 B2
(45) Date of Patent: Jan. 9, 2007

(54) MARK DELIVERY SYSTEM, CENTER APPARATUS, TERMINAL, MAP DATA DELIVERY SYSTEM, CENTER APPARATUS, AND TERMINAL

(75) Inventor: Yuichi Takayanagi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/485,793

(22) PCT Filed: Aug. 8, 2002

(86) PCT No.: PCT/JP02/08136

§ 371 (c)(1),
(2), (4) Date: Feb. 4, 2004

(87) PCT Pub. No.: WO03/016821

PCT Pub. Date: Feb. 27, 2003

(65) Prior Publication Data

US 2004/0225661 A1    Nov. 11, 2004

(30) Foreign Application Priority Data

Aug. 10, 2001 (JP) .......................... 2001-244267
Aug. 10, 2001 (JP) .......................... 2001-244269
Aug. 10, 2001 (JP) .......................... 2001-244270

(51) Int. Cl.
*G08G 1/123* (2006.01)

(52) U.S. Cl. .............................. 340/995.12; 340/539.1; 701/200; 707/10; 705/5

(58) Field of Classification Search ........... 340/995.12, 340/539.1; 701/200, 208, 210; 707/1, 10, 707/3, 6; 705/5, 6, 13
See application file for complete search history.

(56) References Cited

U.S. PATENT DOCUMENTS

| | | | |
|---|---|---|---|
| 5,731,979 A * | 3/1998 | Yano et al. ............... | 701/211 |
| 6,115,669 A * | 9/2000 | Watanabe et al. ........ | 701/209 |
| 6,202,022 B1 * | 3/2001 | Ando ........................ | 701/200 |
| 6,202,026 B1 * | 3/2001 | Nimura et al. ........... | 701/211 |
| 6,591,263 B1 * | 7/2003 | Becker et al. ............. | 707/3 |

FOREIGN PATENT DOCUMENTS

| | | |
|---|---|---|
| JP | 05-134602 | 5/1993 |
| JP | 2000-205878 | 7/2000 |
| JP | 2001-147119 | 5/2001 |
| JP | 2001-194163 | 7/2001 |
| JP | 2001-208549 | 8/2001 |

* cited by examiner

*Primary Examiner*—Anh V. La
(74) *Attorney, Agent, or Firm*—Pearne & Gordon LLP

(57) ABSTRACT

A distribution system, in which a user of a terminal can change a mark freely on mark data or map data distributed by a center system, includes a center system and a terminal. The system comprises a map database 1 for storing map data, a traffic control center 3 for controlling traffic restriction and congestion information, a communication unit 4 for transmitting and receiving the mark data to and from the terminal, a mark database 5 for storing the mark data, and a center server 2 for controlling configurations of the center system. When there is a request to distribute the mark data from the terminal, the center server 2 picks up the mark data from the mark database 5 and distributes it to the terminal, and the mark data transmitted from the terminal is stored in the mark database 5.

44 Claims, 9 Drawing Sheets

WHEN MOVING AT LOW SPEED    WHEN MOVING AT HIGH SPEED

WHEN STOPPING

FIG. 11

DISPLAY ITEM SETTING BOX

- ☒ BASIC LINK
- ☒ TOTAL LINK
- ☒ NODE DISPLAY
- ☐ BASIC NODE NUMBER LINK
- ☐ TOTAL NODE NUMBER
- ☒ TOLL ROAD

- ☒ WATER SYSTEM
- ☒ CONFIGURATION OF FACILITY
- ☒ RAILWAY
- ☒ SIGNAL LIGHT DISPLAY
- ☒ NAME OF INTERSECTION
- ☐ GRID LINE
- ☒ DISPLAY OF HISTORY
- ☐ KKD DISPLAY
  - DISPLAY OF DETAIL…

- ☒ NAME OF FACILITY
  - DISPLAY OF DETAIL…
- ☒ LOCATION AND OTHER POSITION
  - DISPLAY OF DETAIL…
- ☒ TOTAL NODE NUMBER
  - DISPLAY OF DETAIL…
- ☐ ATTRIBUTE SELECTION DISPLAY WITHIN LINK
- ☐ STREET MAP DISPLAY

- ☒ ONE MESH ONLY
- ☒ LINK RESTRICTION
- ☐ RESTRICTION AT INTERSECTION
- ☐ ADMINISTRATIVE BOUNDARY POSITION
- ☒ VICS DISPLAY SETTING
  - DISPLAY OF DETAIL…

OK

ENLARGED DISPLAY

TRAFFIC CONGESTION
INFORMATION

ENLARGED DISPLAY

TRAFFIC CONGESTION
INFORMATION

MARK DELIVERY SYSTEM, CENTER APPARATUS, TERMINAL, MAP DATA DELIVERY SYSTEM, CENTER APPARATUS, AND TERMINAL

FIELD OF THE INVENTION

The present invention relates to a mark distribution system, a center system and terminals, via which a mark can be distributed, and also to a map data distribution system, a center system and terminals, via which a map data can be distributed.

BACKGROUND ART

In the past, a type of navigation system for vehicle has been known, in which business information at each point is transmitted from an information transmitting unit, and upon receipt of the information at the vehicle, the business information of each point (e.g. information of a filling station) on a map is displayed so that a driver of the vehicle can easily gain access to the point in operation (JP-A-5-134602).

Also, a service has been known in the past, which distributes POI (Point Of Interest) information from the center upon request of a user. This service is to distribute a mark showing an information-distributed point to the vehicle and to display the mark at a point on the map. However, the service can provide only the display of the mark determined at the center, and it cannot perform registration of the user's own navigation point or cannot change the mark (1st problem).

Also, a map distribution service has been known in the past, which distributes a map data with mark information superimposed on it to a handy phone. However, it is not a service to distribute the mark data itself to a terminal such as handy phone. Moreover, it is not a service, by which a terminal user can change or edit the distributed mark data (2nd problem).

Further, an application of recent handy phone service is now known, which distributes a map data to handy phone. However, time is not included in the information, and it is not possible to change background color, for instance, depending on the time of receiving of the distributed map data (3rd problem).

Also, there is a problem in that no classification of daytime mode and night mode is given, and the map service function is not provided, which takes the information on stores and facilities in operation in a given time zone into account (4th problem).

The distributed map data is an ordinary bit map data or a vector data, and it is a simple data, which can be scrolled in any desired direction, and it is not possible to edit the distributed map data or to share the edited map data (5th problem).

Further, the amount of the distributed data is not dynamically changed depending on the communication status, and only a given amount of data has been distributed in the past (6th problem).

DISCLOSURE OF THE INVENTION

To overcome 1st and 2nd problems, it is an object of the present invention to provide a mark distribution system, by which a terminal user can freely change the mark on the mark data distributed by the center system.

To overcome 3rd and 4th problems, it is another object of the present invention to provide a center system, a terminal, and a map data distribution system, by which a processed map data can be distributed depending on a given time zone.

Further, to overcome 5th problem, it is still another object of the present invention to provide a center system, a terminal, and a map data distribution system, by which it is possible to distribute the map data from the center system to the terminal, to edit the distributed map data and to transmit it from the terminal, to receive the transmitted map data at the center system and to update the map data.

Also, to overcome 6th problem, it is yet still another object of the present invention to provide a center system and a map data distribution system, by which it is possible to dynamically change the amount of the distributed data from the center system to the terminal depending on the communication status.

The center system according to the present invention comprises a mark database for storing a mark data, communication means for transmitting and receiving the mark data to and from a terminal, and control means for picking up the mark data to be distributed from said mark database and for distributing it to said terminal, and for updating the mark data in said mark database based on the mark data transmitted from said terminal.

Also, the terminal according to the present invention comprises format selection means for selecting a format of the mark data, communication means for transmitting and receiving the mark data to and from a center system, mark display means for displaying the mark, interface means for giving and taking the information to and from an external device, and control means for performing various types of control for the terminal and for changing said mark, whereby said control means downloads said mark data from said center system via said communication means, changes the mark obtained from said downloaded mark data and uploads the changed mark to said center system by turning the mark to a predetermined format.

Further, the mark distribution system according to the present invention comprises a map database for storing a map data, communication means for transmitting and receiving data to and from a terminal, data mode setting means for changing a data mode to be distributed to said terminal depending on time zone, and control means for processing the map data to be distributed from said map database according to setting of said data mode setting means and for distributing the data to said terminal.

Also, the terminal of the present invention comprises input means for inputting information, communication means for transmitting and receiving data to and from a center system, map data storage means for storing a map data, display means for displaying the map data, display mode setting means for setting a display mode of said map data display means, and control means for performing various types of control for the terminal, whereby said control means is designed to receive and display the map data selected according to at least one of the weather information from said center system via said communication means or the data mode in the time zone, and to display the map data in the display mode preset by said display mode setting means.

The map data distribution system of the present invention comprises the center system and the terminal as described above.

According to the present invention, a map data is distributed from a center system to a terminal. When a user of the terminal becomes aware of a byway or the like upon receipt of the distributed data, the user edits the map data on the screen and adds the byway or the like to the map data. Then, the added map data is transmitted to the center system, and the map data at the center system is updated. When the map data added with the byway or the like is transmitted from the terminal to the center system, communication fee is made free and it is recommended to the user to transmit the map data. At the center system, the map data is updated and accuracy of the map data at the center system is increased.

BRIEF DESCRIPTION OF THE DRAWINGS

FIG. 11 shows how display mode is set at the terminal in case the present invention is arranged as a map data distribution system in the second embodiment;

BEST MODE FOR CARRYING OUT THE INVENTION

Figure 1:
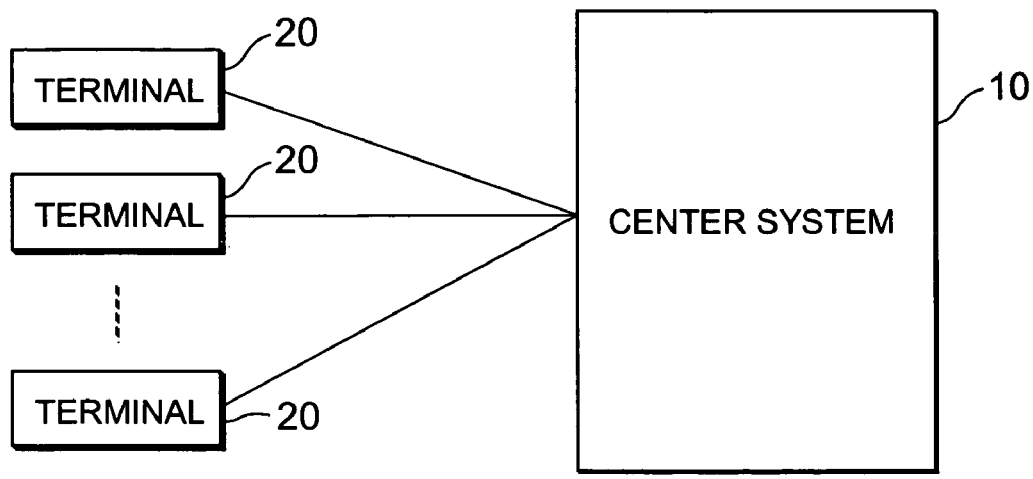
FIG. 1 is a block diagram showing an arrangement of a mark distribution system according to a first embodiment of the present invention. It also shows an arrangement of a map data distribution system according to a second embodiment and a third embodiment of the invention.

Description will be given below on embodiments of the present invention referring to the drawings.

FIG. 1 is a block diagram showing an arrangement of a mark distribution system in a first embodiment of the present invention, and the system comprises a center system 10 and terminals 20. In FIG. 1, the center system 10 and the terminals 20 are connected by solid lines, showing wired connection while it is needless to say that wireless connection may be used. Although a plurality of terminals are shown in the figure, there may be only one terminal.

Figure 2:
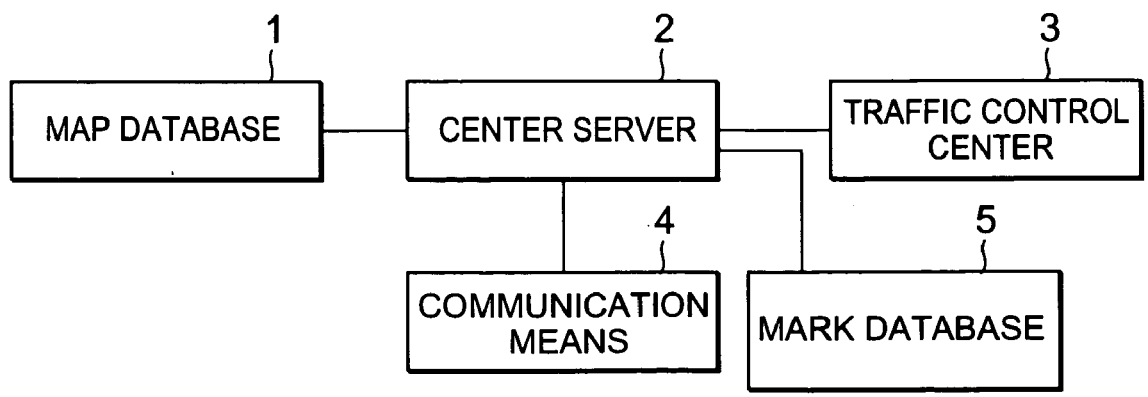
FIG. 2 is a block diagram showing an arrangement of the center system shown in FIG. 1.

FIG. 2 is a block diagram showing an arrangement of the center system of FIG. 1. The center system comprises a map database for storing map data, a traffic control center 3 for controlling traffic information such as traffic restriction or congestion, communication means 4 for transmitting and receiving the map data or mark information to and from the terminals, a mark database 5 for storing the mark information to be distributed to the terminals, and a center server 2 for connecting the map database 1, the traffic control center 3, the communication means 4, and the mark database 5.

Now, description will be given on the assumption that the terminals are mounted on a vehicle such as an automobile. When there is a request to distribute the mark data (information) from the terminals 20, the center server 2 picks up the mark data from the mark database 5 and distributes the data to the terminals 20 via the communication means 4. It also receives the mark data transmitted (uploaded) from the terminals 20 via the communication means 4 and stores it in the mark database 5. In this case, the center server 2 receives traffic restriction or traffic congestion information from the traffic control center 3 and can transfer the information together with mark information corresponding to the traffic restriction and traffic congestion information when the data is downloaded to the terminals 20. Description will be given later as to how the mark data distributed to the terminals are changed or what type of format is used for transmitting (uploading). When the mark data is transmitted (uploaded), it is recommended to transmit (upload) the mark data from the terminals without charging communication fee to the user, and the center system 10 stores the mark data and asks the other users to utilize the transmitted mark data.

When the map data is to be distributed, the center server 2 picks up the map data from the map database 1 and distributes the data to the terminals 20 via the communication means 4. In this case, the center server 2 receives traffic restriction and congestion information from the traffic control center 3 and can transfer the information together with the traffic restriction and traffic congestion information when the map data is downloaded to the terminals 20.

In order to transmit and receive the mark data and the map data to and from the terminals 20, the communication means 4 performs data communication via data communication modes such as radio communication including W-CDMA, light wave or electric wave beacon, or FM multiplexing communication.

Figure 3:
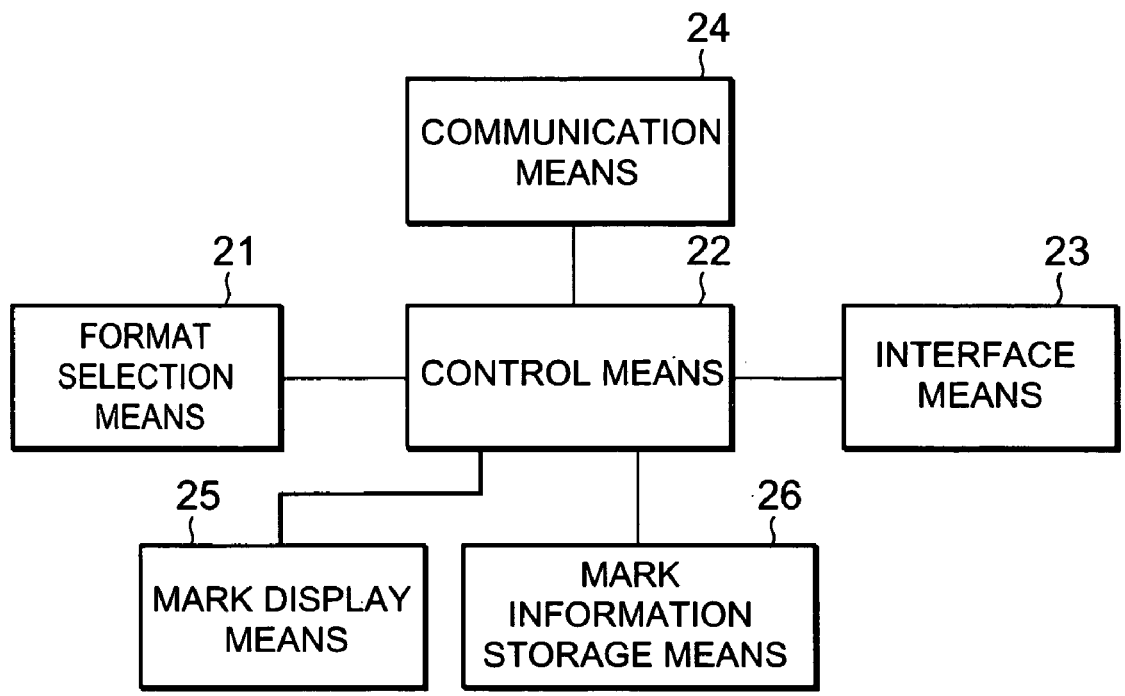
FIG. 3 is a block diagram showing an arrangement of the terminals shown in FIG. 1.

FIG. 3 is a block diagram showing an arrangement of a terminal shown in FIG. 1. The terminal comprises format selection means 21 for selecting format of the mark data, communication means 24 for transmitting and receiving the mark data and the map data to and from the center system, mark display means 25 for displaying the mark, mark information storage means 26 for storing the mark data, interface means 23 for giving and receiving information to and from external devices, and control means 22 for performing various controls on the terminals 20 and for changing the mark. As the terminal, various types of terminal equipment are used such as handy phone, navigation system for vehicle, or personal digital assistant (PDA).

The control means 22 downloads the mark data from the center system via the communication means 24 and changes the mark obtained from the downloaded mark data. It also turns the changed mark to a predetermined format and transmits it to the center system.

The communication means 24 makes it possible to perform data communication via data communication modes such as radio communication including W-CDMA, light wave or electric wave beacon, or FM multiplexing communication in order to transmit and receive the mark data or the map data to and from the center system 10.

The format selection means 21 selects format of the mark data in order that the data can be easily handled by the user when the mark data is downloaded from the center system 10 or the data is transmitted (uploaded) to the center system 10.

The interface means 23 is provided with data communication function such as Bluetooth, I rDA, PDC (16-core), etc. for data transfer to and from external devices such as personal computer. Also, it can incorporate the mark data prepared at the external device into the mark information storage means 26 via the interface means 23, and it can also transmit the data to the center system via the communication means 24.

The mark display means 25 confirms the downloaded mark data or displays the mark when the mark is changed by the control means 22. The changed mark data can be stored at the mark information storage means 26. The data can be transmitted to the center system to make the data registrable, and it can also utilize the mark data, which has been registered to the other user.

When the mark prepared by a user is to be used by another user, a fee for the user must be paid to the user who prepared the mark. When the changed mark data is uploaded, the data is transmitted by adding an identifier to specify the selected format.

Also, a header to make the communication fee free is added to the format. In so doing, it is possible to promote user's will to create the mark and this further promotes the utilization of the mark data.

Figure 4:
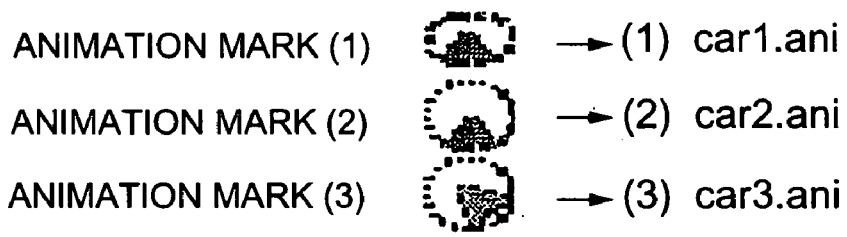
FIG. 4 shows examples of the mark data used in the embodiments of the present invention.
Figure 5:
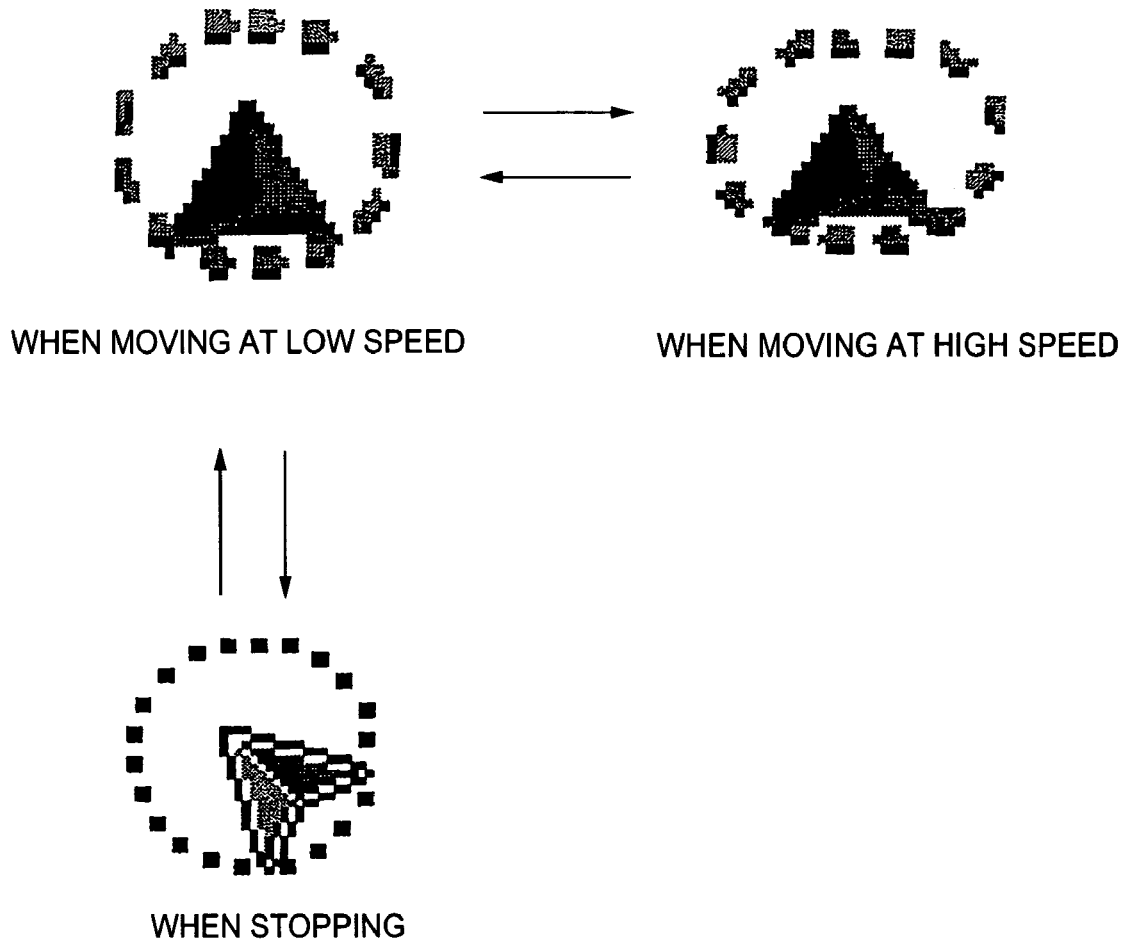
FIG. 5 represents enlarged views of the marks shown in FIG. 4.

FIG. 4 indicates an example of the mark data. In FIG. 4, icons for a vehicle are turned to animated pictures in 3 steps, and the icons for vehicle are changed according to moving speed of the vehicle. That is, an animation mark (3) indicates a status where the vehicle is stopped. An animation mark (2) shows a status where the vehicle is moving at low speed. An animation mark (1) indicates a status where the vehicle is moving at high speed. The animation marks (3)–(1) are selectively displayed according to the moving speed of the vehicle. FIG. 5 shows enlarged views of the animation marks shown in FIG. 4 respectively. The animation marks are changed in 3 steps, i.e. when the vehicle is stopped, when moving at low speed, and when moving at high speed. By these marks, it is possible to identify the moving information of the other vehicle when the moving information of own vehicle is sent to the other vehicle. When the animation mark is to be changed, it is necessary to instruct the change of the mark. This instruction of the change can be given by inputting of number (e.g. a number related to animation shown in FIG. 4 is inputted.). The letters "ani" shown in the format represent an extension showing that it is a file prepared to give animation display.

Figure 6A:
FIG. 6A and FIG. 6B each represents an example of a variation of the mark prepared by a user in the embodiments of the present invention.
Figure 6B:

FIG. 6A and FIG. 6B each represents a variation example of the mark prepared by the user. FIG. 6A shows a mark to indicate traffic congestion information received from the center system. This mark has a number "1" in it. To this mark, a user can change the mark as shown in FIG. 6B. The meaning of the mark is the same, but it can be changed to any form as desired. Further, a number "11" is given to this mark. If a mark preferred by the user is registered together with number information, it is possible to change to the mark preferred by the user by merely inputting the number.

When the mark data is downloaded, traffic information linked with the data at the traffic control center 3 is downloaded. During the reproduction of the mark data, traffic information linked with the traffic control such as: "an emergency vehicle is in operation on the road ahead" or "traffic jam 200 meters ahead", etc. is reproduced.

Now, detailed description will be given on the setting of the mark data as given above.

In the present invention, the mark data is prepared according to one of the following formats:

(1) Format when data is GIF data (the same as JPEG or PNG data)

```
<Mark data>
    <Prepared by> xxxxxx mailtoxxx@its.mci.mei.co.jp
    <Data type> 0:ani 1:JPEG 2:GIF 3:PNG (Example) 2
    <Mark position> 0x8983, 0x2000, 0x2000
    <Shape number> 1
    <File name> http: //www.centerserver/markdata/mark1.gif
    <Audio data type> 0: Japanese 1:PCM 2:ADPCM 3:VSELP
            (Example) 0
    <Audio data> Traffic jam 200 meters ahead
/<Mark data.
```

(2) Format in case of ani data

```
<Mark data>
    <Prepared by> xxxxxx mailtoxxx@its.mci.mei.co.jp
    <Data type> 0:ani 1:JPEG 2:GIF 3:PNG (Example) 0
    <Mark position> 0x8983, 0x2000, 0x2000
    <Shape number> 2
    <Number of reproductions> 3
    <Reproduction interval ms> 200 ms
    <Reproduction number 1> ani 1
    <Reproduction number 2> ani 2
    <Reproduction number 3> ani 3
    <File name> http: //www.centerserver/markdata/mark1.gif
    <Audio data type> 0:Japanese 1:PCM 2:ADPCM 3:VSELP
            (Example) 0
    <Audio data> Traffic jam 200 meters ahead
/<Mark data>
```

In the above, if "Japanese (language)" is specified, the data is converted to voice corresponding to the text data by voice synthesizing function at the terminal from the text data file. In other cases, the file name is specified in the definition of <Audio data>. Based on the instruction, the terminal downloads sound source data from the center system in advance and the voice is reproduced. For instance, in case of ADPCM practically used in the navigation system, the file name is specified as:

<Audio data>http://www.xxxxxx.co.jp/adpcm.dat

Then, the data is downloaded according to the instruction and it is reproduced.

(3) In case the mark is changed

By specifying the pass of <file name> as file://user/xxx.gif, the mark can be changed. As a result, the mark can be changed to the preferred mark.

(4) In case of uploading

The data can be uploaded to the center when the user defines <upload>.

<Upload>center URL (http://www.xxxxxx.xx.xx)

(5) In case of downloading

By defining <download>, the data can be retained in each terminal.

The above can be summarized as shown in Table 1 below.

TABLE 1

List of items of definition

| List of definition grammar | Description | Remarks |
|---|---|---|
| <Mark data> | Defines that it is a mark data. | Definition of a mark by adding/<Mark data> at the end. |

TABLE 1-continued

List of items of definition

| List of definition grammar | Description | Remarks |
|---|---|---|
| <Prepared by> | Gives mail address of the preparer. | |
| <Data type> | Indicates type of mark shape. | 0: ani 1: JPEG 2: GIF 3: PNG |
| <Shape number> | Identification number of mark | |
| <Reproduction interval> | Only the case of animation mark: This indicates interval after one animation mark has been reproduced. | |
| <Number of reproductions> | Indicates number of reproductions of animation mark | If it is 0, it is repeated infinitely. |
| <Reproduction number> | Based on the number of reproductions, this indicates data for mark reproduction sequentially from No. 1. | |
| <File name> | Indicates pass of the center or the terminal where the mark data is stored. | |
| <Audio data type> | Indicates type of audio data. | 0: Japanese 1: PCM 2: ADPCM 3: VSELP |
| <Audio data> | Gives data based on audio data type | When 0 is specified in the above → Voice in Japanese synthesized from text data; When 2 is specified in the above → Full pass name/data file |
| <Upload> | If this identifier is given, it is possible to transmit. | |
| <Download> | If this identifier is given, it is possible to receive. | |
| <Mark position> | Indicates information on mark position. | See (Note 1) below. |

In the following, description will be given on (Note 1) at the end of Table 1. When a map data is given, the whole country can be expressed by using the primary mesh code. Description will be given below on a method to express mark position information in a map area where a number of 5339 is assigned as the primary mesh code.

Figure 7:
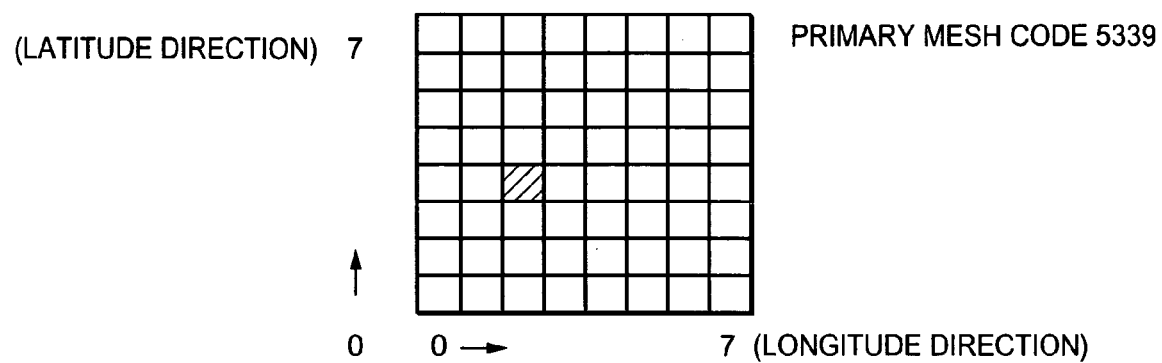
FIG. 7 is a drawing to explain how a position of a mark in a primary mesh code in the first embodiment is given by a secondary mesh code.

The primary mesh code 5339 is further divided to 8×8. This can be expressed as shown in FIG. 7. If we consider the secondary mesh code of the shaded portion enclosed by matrix intersections in FIG. 7, the primary mesh code is 5339, and it is 3 in direction of the latitude, and 2 in direction of the longitude. Thus, the secondary mesh code is given as 533932. The reference point code (secondary mesh code of the westernmost point in Japan) is given by 372200. Therefore,

533932−37220=161732

This value is the secondary mesh code of the mark position. This is separated to four parts of 16, 17, 3, and 2, and it is expressed as:

16 * 8 + 3 = 131  low-order 1 byte
17 * 8 + 2 = 138  high-order 1 byte

When this is converted to hexadecimal number, it is 0x8A83. This is an expression (in hexadecimal number) in the secondary mesh code of the mark position. The notation "0x" is used to indicate that it is an expression in hexadecimal number.

Figure 8:
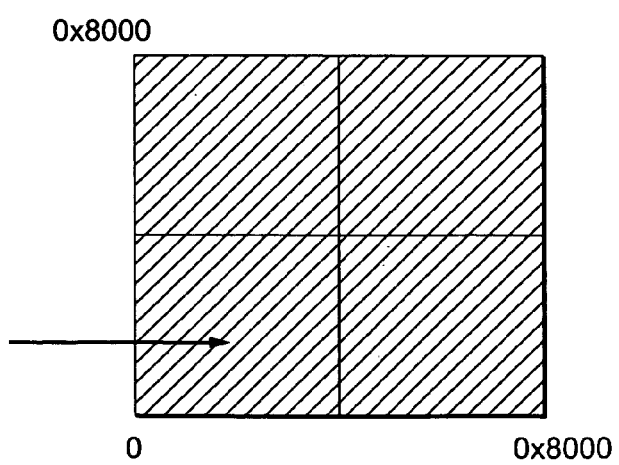
FIG. 8 shows an example, in which a mark position at the tip of an arrow is expressed by "0x2000 and 0x2000" on a map data of hexadecimal notation in the first embodiment.

Next, two numeral values are added in order to indicate at which position in the map data this mark position is displayed. FIG. 8 shows an example where the position of a mark shown by tip of an arrow is expressed as 0x2000 and 0x2000 in the map data, which is shown by 0x8000 in hexadecimal number.

Therefore, as the expression of total mark position, it is expressed: <mark position> 0x8A83, 0x2000, 0x2000 as shown in the format of GIF data and ani data. In case the user can identify the data of latitude and longitude, the user may substitute the value by using a conversion tool.

Next, description will be given on a map data distribution system according to a second embodiment of the present invention.

The arrangement of the map data distribution system of the present invention is the same as shown in the block diagram of FIG. 1, which was explained in connection with the first embodiment.

Figure 9:
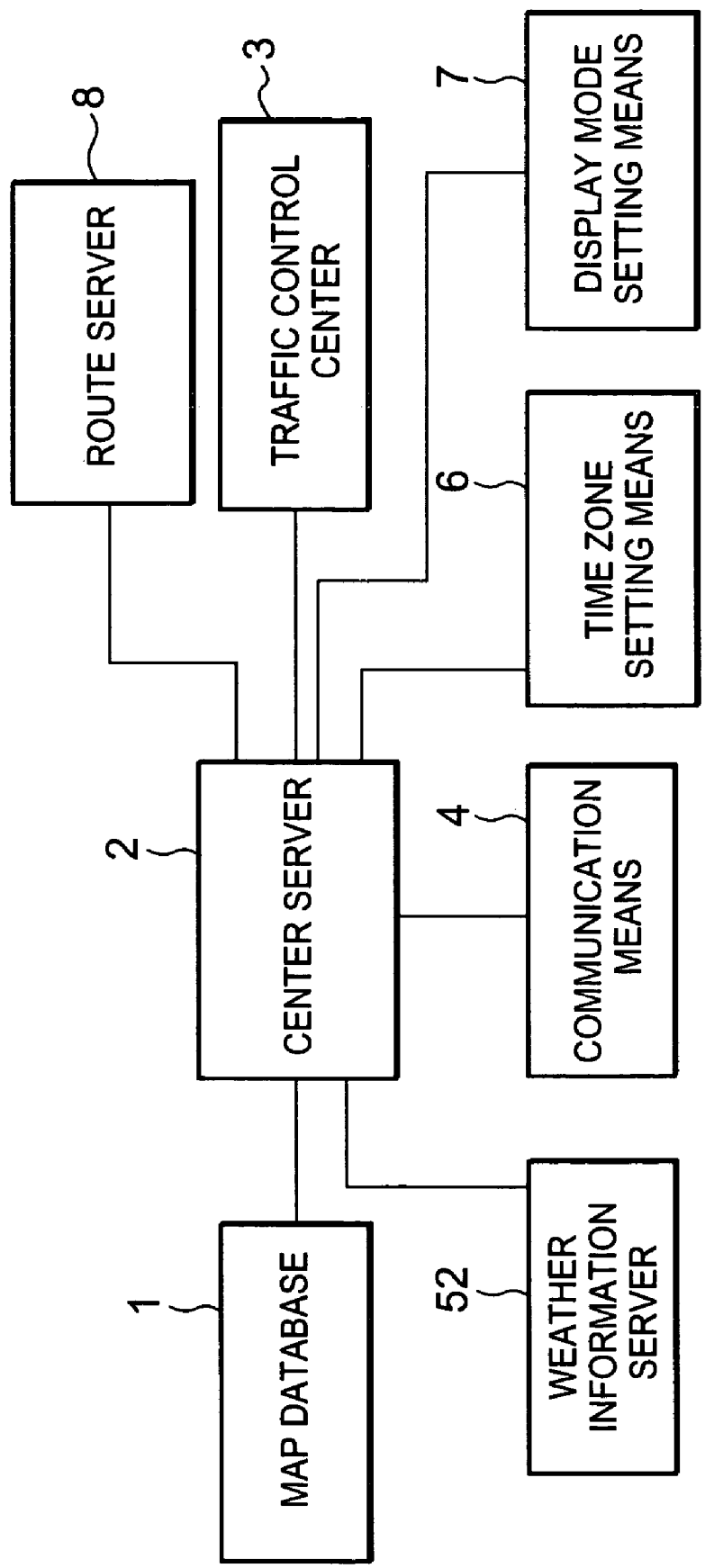
FIG. 9 is a block diagram showing an arrangement of the center system in FIG. 1 in case the present invention is arranged as a map data distribution system in the second embodiment.

FIG. 9 is a block diagram showing an arrangement of a center system in FIG. 1, which constitutes a map data distribution system according to a second embodiment of the present invention. A center system 10 comprises a map database 1 for storing a map data, a traffic control center 3 for controlling traffic information such as traffic restriction or traffic congestion information, communication means 4 for transmitting and receiving data to and from terminals, a weather information server 52 for controlling weather information, time zone setting means 6 for setting data mode to the terminal depending on a given time zone, display mode setting means 7 for setting display mode of a map to be displayed, a route server 8 for controlling sightseeing guide information, and a center server 2 for controlling each of the component elements of the center system. In FIG. 9, an arrangement example is shown, which comprises all of the weather information server 52, the time zone setting means 6, the display mode setting means 7, and the route server 8, while the center system may not necessarily comprise all of the time zone setting means 6, the display mode setting means 7, and the route server 8.

The center server 2 receives a data mode corresponding to the time zone for transmission from the time zone setting means 6 and also receives a display mode of a map to be displayed from the display mode setting means 7. Also, it receives weather information from the weather information server 52 and the sightseeing guide information from the route server 8. Further, the center server 2 receives from the traffic control center 3 a traffic restriction and congestion information, and further, signal light information when signaling procedure of the signal light varies according to time zone.

When transmission of a map data is requested from a terminal 20, the center server 2 picks up a map data to be transmitted from the map database 1 and transmits it to the terminal 20 via communication means 4. In this case, the center server 2 receives display mode information on display mode (e.g. background color of the map) of a map to be displayed from the display mode setting means 7, and it also receives data mode corresponding to the time zone to be transmitted (e.g. three data modes of morning, afternoon, and night) from the time zone setting means 6. Further, it receives weather information (e.g. fine weather, cloudy, rainy, snow, etc.) from the weather information server 52. Also, it may be designed in such manner that, when the map data is transmitted to the terminal 20, traffic restriction and congestion information may be sent. Also, signal light information may be sent if signaling procedure of the signal light varies according to the time zone from the traffic control center 3 when the map data is transmitted to the terminal 20. Further, the sightseeing guide information may be transferred from the route server 8.

The center server 2 processes the map data to be distributed from the map database 1 in response to the data mode in the time zone preset by the time zone setting means and distributes it to the terminal. The map data to be distributed may contain, in addition to the preset time zone, the preset display mode or the map data corresponding to the weather information, information on stores and facilities in operation in the relevant time zone or information on railway in operation in the relevant time zone.

Regarding the information on railway in operation in the relevant time zone, in case the starting time of the last train is already over while it is not yet the starting time for the last train in another route of the railway, the route with no more train in operation is discarded from the display, and the other route is displayed. In this manner, the display of the railway route can be selectively determined according to the time zone. In case of signal light, some signal lights are changed to continuous flashing in yellow color late at night or early in the morning, or some signal lights are turned to flashing in red color. Such information on signal lights is received by the center server 2 from the traffic control center 3, and this information is transferred together when the map data is distributed to the terminal.

In order to transmit and receive the data to and from the terminal 20, the communication means 4 is provided with means for carrying out data communication via any of the data communication modes such as radio communication including W-CDMA, light wave or electric wave beacon, or FM multiplexing communication.

Figure 10:
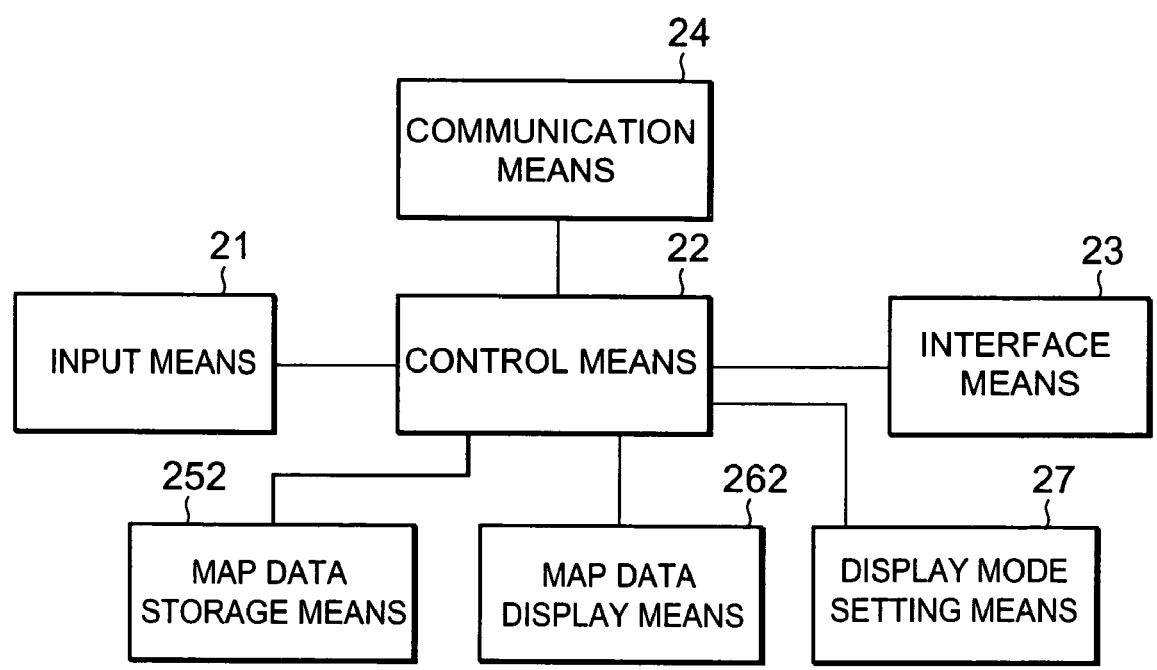
FIG. 10 is a block diagram showing an arrangement of the terminal system in FIG. 1 in case the present invention is arranged as a map data distribution system in the second embodiment.

FIG. 10 is a block diagram showing an arrangement of the terminal in FIG. 1. The terminal comprises input means 21 for inputting information by using touch pen, pointing device, etc., communication means 24 for transmitting and receiving data to and from the center system as described above, map data storage means 252 for storing the map data, map data display means 262 for displaying the map data, display mode setting means 27 for setting the display mode of the map data display means 262, interface means 23 for giving and taking information to and from external devices, and control means 22 for performing various types of control for the terminal 20.

The control means 22 receives weather information from the center system 10 via the communication means 24, and also the data mode in a preset time zone or map data processed according to the preset display mode and displays the data. The communication means 24 is provided for carrying out data communication via any of the data communication modes such as radio communication including W-CDMA, light wave or electric wave beacon, or FM multiplexing communication in order to transmit and receive data to and from the center system 10.

The display mode setting means 27 sets, for instance a display mode of the map data display means 262 at the terminal in response to the time zone, by which the modes of morning, afternoon, and night as set by the center system 10 is subdivided. In this case, the time zone can be specified by the time (timer) controlled by the terminal 20. Instead of the subdivided time zones, the display mode of the map data display means 262 may be set to suit the preference of the user. Further, the display mode of the map data display means 262 may be set in such manner as to cope with the subdivided time zone and with the preference of the user. As a result, this makes it possible for the user to see the map by changing the background color to a color easier to look at.

FIG. 11 is a drawing to show how the display mode is set at the terminal 20. In FIG. 11, the user sets the preference by entering a check mark to a selected column in the display item setting box. In the present example, the check mark may be entered to an item selection column such as shape of facility, name of facility, railway, signal light, etc. In the more detailed setting, each color code is set. At the last moment, OK button is pressed, and the setting procedure is completed.

The interface means 23 is provided with data communication functions such as Bluetooth, I rDA, PDC (16-core), USB, etc. These means can give and take the data via short-distance communication to and from external devices, e.g. personal computer, car navigation system, personal digital assistant (PDA), portable telephone system including W-CDMA, PHS (personal handy-phone system), etc. When being provided with the interface means 23 as described above, a map data prepared by a personal computer can be incorporated, for instance. Or, the map data received at the terminal 20 can be incorporated into a personal computer.

Next, description will be given on a map data distribution system according to a third embodiment of the present invention.

The arrangement of the map data distribution system of the third embodiment of the present invention is the same as the arrangement shown in FIG. 1, which was explained in connection with the first embodiment and the second embodiment.

Figure 12:
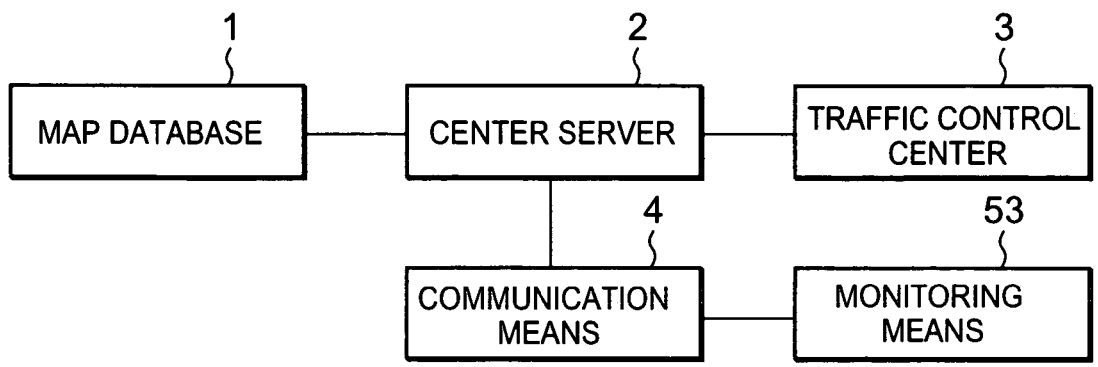
FIG. 12 shows how display mode is set at the center system in case the present invention is arranged as a map data distribution system in the third embodiment.

FIG. 12 is a block diagram showing an arrangement of the center system shown in FIG. 1. The center system 10 comprises a map database 1 for storing map data, a traffic control center 3 for controlling traffic information such as traffic restriction and congestion information, communication means 4 for transmitting and receiving map data to and from the terminal 20, monitoring means 53 for monitoring communication status of the communication means 4, and a center server 2 for connecting the map database 1, the traffic control center 3, and the communication means 4.

When the distribution of map is requested from the terminal 20, the center server 2 picks up a map data from the map database 1 and distributes it to the terminal 20 via the communication means 4. Also, it receives the map data transmitted from the terminal 20 via the communication means 4 and updates the map data in the map database 1. Further, the center server 2 receives traffic restriction and congestion information from the traffic control center 3. When the map data is distributed to the terminal 20, it is transferred together with the traffic restriction and congestion information. The user at the terminal 20 adds a byway (which the user has found) to the distributed map data and files the data, and this is transmitted from the terminal 20. Editing of the distributed map data at the terminal 20 or format for transmission will be described later. When the map data is transmitted, it is recommended to transmit the map data from the terminal 20 without imposing communication fee to the user. The center system 10 updates the map data, and the accuracy of the map data of the center system 10 is increased.

In order to carry out transmission and receiving of the map data to and from the terminal 20, the communication means 4 makes it possible to perform data communication via any of the data communication modes such as radio communication including W-CDMA, light wave or electric wave beacon, or FM multiplexing communication.

The monitoring means 53 is connected to the communication means and monitors communication status to and from the terminal 20 via the communication means 4, and the result is sent to the center server 2. The center server 2 controls the amount of information of the distributed map data depending upon the communication status and transfers the data. More concretely, when the communication status as monitored by the monitoring means is poor, the map data information may be transferred intermittently, or the map to be distributed is changed to a map for wider area, or traffic restriction and congestion information is deleted to reduce the amount of the transferred data.

Figure 13:
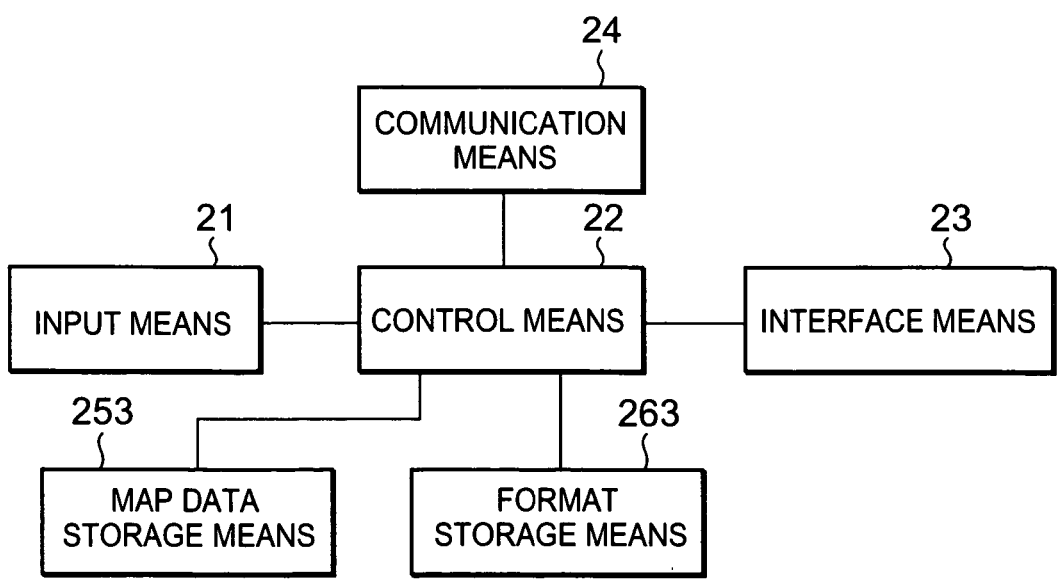
FIG. 13 is a block diagram showing an arrangement of the terminal shown in FIG. 1.

FIG. 13 is a block diagram showing an arrangement of the terminal shown in FIG. 1. The terminal 20 comprises input means 21 for inputting information by using touch pen, pointing device, etc., communication means 24 for transmitting and receiving map data to and from the center system 10, map data storage means 253 for storing the map data, format storage means 263 for storing format of editing and delivery of the map data, interface means 23 for giving and taking information to and from external devices, and control means 22 for controlling the terminal 20.

The control means 22 receives the map data from the center system 10 via the communication means 24 and edits the received map data. The map data thus edited is transmitted to the center system 10 in a predetermined format.

In order to transmit and receive the map data to and from the center system 10, the communication means 24 carries out data communication via any of the data communication modes such as radio communication including W-CDMA, light wave or electric wave beacon, or FM multiplexing communication.

The format storage means 263 stores format for editing and delivery of the map data. It can cope with the format for handling various types of image data such as vector information, bit map information, etc.

Taking an example in vector information, points are plotted using the input means 21 on a map displayed on a terminal screen. Then, the data is managed by differential mode as dot series information of vector, and the amount of data to be stored or processed can be compressed.

Figure 14:
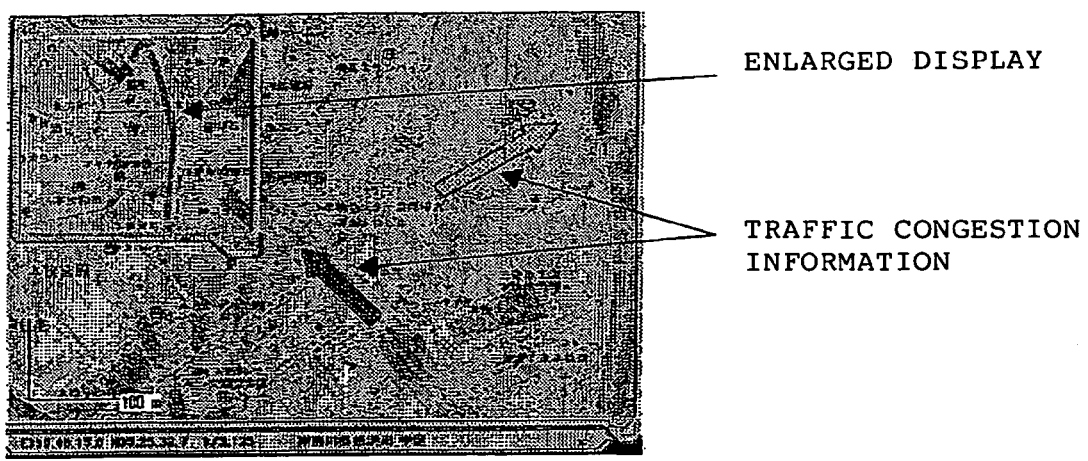
FIG. 14 shows an example of display on a terminal screen after distribution of map data in case the present invention is arranged as a map data distribution system in the third embodiment.
Figure 15:
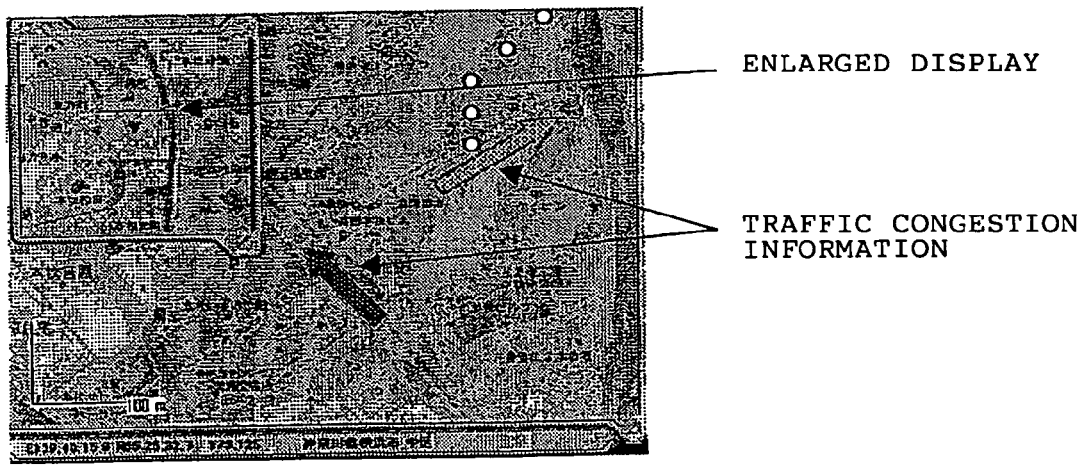
FIG. 15 shows an example of display on a user's editing screen in case the present invention is arranged as a map data distribution system in the third embodiment.

FIG. 14 shows an example of display on a terminal screen after the map data has been distributed. FIG. 15 is an example of display on a user's editing screen. To the map data shown in FIG. 14, differential information (marked with ○ at 5 points) is added, and the data is transmitted to the center system. In FIG. 14 and FIG. 15, a map reduced in size to show which map area is enlarged is also displayed. Further, traffic congestion information is shown by a thick arrow mark on the enlarged map.

In the past, the following two modes have been known to express one point when starting point data and end point data are transmitted as the enumerated information.

<1st Mode>

This is the mode to express all coordinates by absolute longitude and absolute latitude. For instance, 1350°20'40" is expressed as:

$$135*3600+20*60+40=487240$$

An area of 4 bytes is required to express this. The same applies to the latitude, and an area of 4 bytes is required. As a result, 4-byte area is required for each of X and Y.

This is because a 4-byte area is required in each of longitude direction and latitude direction of the secondary mesh code of the map (the data cannot be expressed without an area of 4 bytes). If it is expressed by 7 points, 56 bytes are needed (7×8=56 bytes).

<2nd Mode>

The second mode is to express normalized coordinates (0–0x8000) of X and Y after the starting point is defined in the secondary mesh code (2 bytes) by 2 bytes each. To express 7 points, 30 bytes are needed (2+4*7=30 bytes).

In contrast, pen-up and pen-down information is utilized in the present invention. More concretely, 2 bits are assigned to 4 types of information, i.e. starting point information, end point information, and two types of on-the-way information (differential information). By seeing the first 2 bits, it is possible to judge which of the four types of information it is. In case it is the on-the-way information (differential information), the data is expressed by 1 byte.

An example is given here on a case where 7 points are sampled as real data, and description will be given on the difference of data amount between the conventional case and the present invention.

In case of the conventional 2nd mode, 30 bytes are needed (2+4*7=30 bytes).

In the present invention,

Starting point (secondary mesh code)

6 bytes (2 bytes+2-byte in X direction+2-byte in Y direction)

On-the-way information (differential information) 5 points 5 bytes

End point information 1 point 4 bytes

With 15 bytes in total, data compression ratio is about 50% in the conventional 2nd mode.

The above can be summarized as shown in Table 2 below. Table 2 shows compressed data structure.

TABLE 2

Compressed data structure
The leading 6 bytes store the secondary mesh code and the normalized coordinates.

| 1st bit | 2nd bit | | |
|---|---|---|---|
| 0 | 0 | Starting point X coordinates (15 bits) | Starting point Y coordinates (15 bits) |
| 0 | 1 | End point X coordinates (15 bits) | End point Y Coordinates (15 bits) |
| 1 | 0 | On-the-way point X offset (3 bits) | On-the-way point Y offset (3 bits) |
| 1 | 1 | On-the-way point X offset (7 bits) | On-the-way point Y offset (7 bits) |

To express the secondary mesh code of the starting point (a value determined from east longitude and north latitude) in 2 bytes, it is assumed, for instance, that the secondary mesh code 533945 is a reference point code (secondary mesh code to express the westernmost end of Japan) 372200. Then,

533945−372200=161745

This is separated to four parts of 16, 17, 4 and 5, and it is expressed as:

16*8+4=132 low-order 1 byte

17*8+5=141 high-order 1 byte

When this is turned to hexadecimal digit, the high-order 1 byte is turned to 141, and this is expressed as 8Dh.

The low-order 1 byte is turned to 132, and this is expressed as 84h.

Then, it can be expressed as: 8D84h.

Next, data format to transmit byway data to the center system is defined as shown in Table 2. For instance, an example of a byway shown by the mark ○ in FIG. 15 is expressed as follows:

```
<Byway POI>
<Number> 7
<Start># It is assumed that the secondary mesh code is
expressed in 2 bytes. Then,
    0x8D84, 0x2000, 0x2000
</start>
</tpoi># It is supposed that the offset at the on-the-way
point is (3,3), (4,4) and (2,2). If we refer to Fig. 14,
it is the on-the-way point, and the leading 2 bits are 10.
```

When the total digit is expressed in 8-bit row, it is as follows:
When it is 3,3, it is 10011011=9bh
When it is 4,4, it is 10100100=a4h
When it is 2,2, it is 10010010=92h Therefore, in case of:
0x9b, 0xa4, 0x92

```
</tpoi>
<end># The last digit is separated as (255,150). Then, it
is turned to 0000000011111111000000010100000. Thus, it
is:
    0x007f80a0
</end>
</byway POI>
```

[Note]
The mark # denotes a note. The symbol 0x is added at the head when the data is defined in hexadecimal digit. POI is an abbreviation of "Point Of Interest".

In the following, the definition of byway data is given in Table 3.

TABLE 3

| Definition of byway data | | |
|---|---|---|
| Definition of data | Meaning | Remarks |
| <Byway POI> | Byway data is defined up to <Byway POI>. | |
| <start> | Starting point is defined up to </start>. Starting point is defined by normalized coordinates (0–0x8000), depending on at which | |

TABLE 3-continued

| Definition of byway data | | |
|---|---|---|
| Definition of data | Meaning | Remarks |
| | position it is in 2-byte mesh code. | |
| <tpoi> | Data is defined up to </tpoi>. It is defined according to the compressed data structure defined in Table 1. | |
| <end> | End point is defined up to </end>. | |
| <number> | This indicates number of points. | |

When the map data thus edited is transmitted to the center system 10, the control means 22 transmits the data by adding an identifier, which specifies the selected format. As the identifier, an identifier to identify vector information or image bit map information can be used. Further, when the edited map data is transmitted to the center system 10, the control means 22 adds a header, which makes the communication fee free. The header is generally used when the data is transferred.

The interface means 23 is provided with data communication function such as Bluetooth, I rDA, PDC (16-core), USB, etc. These are capable to give and take the data via short-distance communication to and from external devices such as personal computer, car navigation system, personal digital assistant (PDA), handy phone including W-CDMA, personal handy-phone system (PHS), etc. Being provided with the interface means 23, it is possible to incorporate the map data prepared by personal computer, for instance.

INDUSTRIAL APPLICABLITY

As described above, according to the present invention, such superb effects can be provided that the user can freely change the marks on the mark data distributed from the center system.

Also, according to the present invention, the distributed mark can contribute to the development of information communication service as "receiving mark" just like the "receiving melody" generally known in the use of handy phone.

Further, the present invention has a center system, which comprises a map database for storing map data, communication means for transmitting and receiving data to and from a terminal, data mode setting means for changing a data mode to be distributed to the terminal depending on time zone, and control means for processing the map data to be distributed from the map database according to the setting of the data mode setting means and for distributing the data to the terminal. As a result, it is possible to distribute the map data processed according to a given time zone from the center system to the terminal (such as handy phone including PHS, car navigation system, or PDA).

Also, it is possible to change the background color to a color easily discernible by the user in watching the map by the display mode, which was set by the display mode setting means in the terminal.

Further, according to the present invention, the map data is distributed to the terminal from the center system. When the user of the terminal where the data has been received becomes aware of a byway or the like, the map data on the screen can be edited, and the byway or the like is added to the map data. The added map data is transmitted to the center system to update the map data at the center system. As a result, the accuracy of the map data at the center system can be increased.

Also, when the map data added with the byway data or the like is transmitted from the terminal to the center system, communication fee is made free, and it is recommended to the user to transmit (upload) the map data. As a result, the map data at the center system is turned to the most up-to-date data, and this contributes to higher accuracy of the map data at the center system.

Further, the amount of the distributed data from the center system to the terminal can be dynamically changed according to the communication status. Thus, no retransmission is requested, and this makes it possible to eliminate unnecessary communication.

What is claimed is:

1. A center system, comprising:
    a mark database f or storing a mark data;
    communication means for transmitting and receiving the mark data to and from a terminal; and
    control means for picking up the mark data to be distributed from said mark database and for distributing it to said terminal, and for updating the mark data in said mark database based on the mark data transmitted from said terminal,
    wherein the mark data transmitted from said terminal is a data of a mark created by a user at said terminal.

2. The center system according to claim 1, wherein, when the mark data changed or created has been transmitted, it is designed in such manner that communication fee is not imposed on the user.

3. The center system according to claim 1, wherein, when the transmitted mark data is downloaded by another user, a predetermined amount of money is paid to said user who transmitted the mark data.

4. The center system according to claim 1, wherein said control means receives traffic restriction and congestion information from a traffic control center, and the mark data corresponding to said traffic restriction and congestion information can be downloaded by the user at the terminal.

5. The center system according to claim 4, wherein the mark data corresponding to said traffic restriction and congestion information is accompanied with audio guide.

6. The center system according to claim 1, wherein an attribute is given to the mark data distributed by the control means, and audio guide is provided when said mark data is reproduced according to said attribute.

7. The center system according to claim 6, wherein, when the mark data based on said attribute is reproduced, animated reproduction is carried out.

8. The center system according to claim 7, wherein, when said terminal is arranged on a vehicle, said animated reproduction is changed in association with moving speed of said vehicle.

9. A terminal, comprising:
    format selection means for selecting a format of the mark data;
    communication means for transmitting and receiving the mark data to and from a center system;
    mark display means for displaying the mark;
    interface means for giving and taking the mark data to and from an external device; and
    control means for performing various types of control for the terminal and for changing said mark,
    wherein said control means downloads said mark data from said center system via said communication means, changes the mark obtained from said downloaded mark data and uploads the changed mark to said center system by turning the mark to a predetermined format.

10. The terminal according to claim 9, wherein, when the changed mark data is uploaded to said center system, and said control means adds an identifier to specify the selected format.

11. The terminal according to claim 10, wherein, when the changed mark data is uploaded to said center system, said control means adds to said format a header for making the communication fee free.

12. The terminal according to claim 9, wherein, when the distributed mark data is changed, a mark number associated with said mark data can be changed by key input.

13. The terminal according to claim 9, wherein, when the distributed mark data is changed, a mark number of the mark data prepared by a user in advance is inputted to exchange with any mark data as desired.

14. The terminal according to claim 9, wherein, when the distributed mark data is reproduced, a mark display and audio information associated therewith are reproduced.

15. A mark distribution system having a center system and a terminal, whereby said center system comprises:
    a mark database for storing a mark data;
    communication means for transmitting and receiving the mark data to and from the terminal; and
    control means for picking up the mark data to be distributed from said mark database and for distributing it to said terminal, and for updating a mark data of said mark database according to the mark data transmitted from said terminal; and
    said terminal comprises:
    format selection means for selecting a format of the mark data;
    communication means for transmitting and receiving the mark data to and from a center system;
    mark display means for displaying the mark;
    mark information storage means for storing said mark data;
    interface means for giving and taking the mark data to and from an external device; and
    control means for performing various types of control for the terminal and for changing said mark,
    wherein said control means downloads said mark data from said center system via said communication means, changes the mark obtained from said downloaded mark data and uploads the changed mark to said center system by turning the mark to a predetermined format.

16. A center system, comprising:
    a map database for storing a map data;
    communication means for transmitting and receiving data to and from a terminal;
    data mode setting means for changing a data mode to be distributed to said terminal depending on time zone; and
    control means for processing the map data to be distributed from said map database according to setting of said data mode setting means and for distributing the data said terminal.

17. The center system according to claim 16, wherein the data mode in the time zone preset by said data mode setting means is one of three data modes of morning, afternoon, and night.

18. The center system according to claim 16, wherein said control means is designed to process the map data to be distributed from said map database according to the data mode in the time zone preset by said data mode setting means and to distribute the data to the terminal.

19. The center system according to claim 18, wherein said map data to be distributed contains information on stores and facilities in operation during the time zone.

20. The center system according to claim 18, wherein said map data to be distributed contains information on railway in operation during the time zone.

21. The center system according to claim 16, wherein there is further provided display mode setting means for setting a display mode of a map to be displayed, and said control means is designed to process the map data to be distributed from said map database depending on the data mode in the time zone preset by said data mode setting means and on the display mode preset by said display mode setting means, and to distribute the data to the terminal.

22. The center system according to claim 21, wherein the display mode preset by said display mode setting means is designed to set a background color of the map to be displayed.

23. The center system according to claim 16, wherein there is further provided a weather information server for controlling weather information, said control means is designed to process the map data to be distributed from said map database depending on the weather information obtained from said weather information server and on the display mode preset by said display mode setting means, and to distribute the data to the terminal.

24. The center system according to claim 23, wherein the display mode preset by said display mode setting means is designed to set a background color of a map in association with said weather information obtained from said weather information server.

25. The center system according to claim 23, wherein said control means is designed to process the map data to be processed from said map database depending on the weather information obtained from said weather information server and on the data mode in the time zone preset by said data mode setting means, and to distribute the data to the terminal.

26. The center system according to claim 16, wherein there is further provided a traffic control center for controlling traffic restriction and congestion information, said control means receives traffic restriction and congestion information from said traffic control center and transfers said map data to the terminal together with said traffic restriction and congestion information.

27. The center system according to claim 26, wherein said control means is designed to receive signal light information with signal light procedure changing according to the time zone from said traffic control center, and to transfer the map data to the terminal together with said signal light information.

28. The center system according to claim 16, wherein there is further provided a route server for controlling a sightseeing guide information, said control means is designed to receive the sightseeing guide information from said route server and to transfer the map data to the terminal together with said sightseeing guide information.

29. A terminal, comprising:
input means for inputting information;
communication means for transmitting and receiving data to and from a center system;
map data storage means for storing a map data;
display means for displaying the map data;
display mode setting means for setting a display mode of said map data display means; and
control means for performing various types of control for the terminal,
wherein said control means is designed to receive and display the map data selected according to at least one of the weather information from said center system via said communication means or the data mode in the time zone, and to display the map data in the display mode preset by said display mode setting means.

30. The terminal according to claim 29, wherein said display mode setting means can set the display mode of the map data displaying means based on the preference of a user.

31. A map data distribution system, having a center system and a terminal, wherein said center system comprises:
a map database for storing a map data;
communication means for transmitting and receiving data to and from a terminal;
data mode setting means for changing a data mode to be distributed to said terminal depending on time zone; and
control means f or processing the map data to be distributed from said map database according to setting of said data mode setting means and for distributing the data to said terminal, and
said terminal comprises:
input means for inputting information;
communication means for transmitting and receiving data to and from a center system;
map data storage means for storing a map data;
display means for displaying the map data;
display mode setting means for setting a display mode of said map data display means; and
control means for performing various types of control for the terminal,
wherein said control means is designed to receive and display the map data selected according to at least one of the weather information from said center system via said communication means or the data mode in the time zone, and to display the map data in the display mode preset by said display mode setting means.

32. A center system, comprising:
a map database for storing a map data;
communication means for transmitting and receiving the map data to and from a terminal; and
control means for picking up the map data to be distributed from said map database and for distributing the data to said terminal and for updating the map data in said map database according to the map data transmitted from said terminal.

33. The center system according to claim 32, wherein the map data transmitted from said terminal is the map data edited by the user at said terminal.

34. The center system according to claim 33, wherein said edited map data is plotted by points on a map displayed on a terminal screen and data is controlled under differential mode as dot series information of vector.

35. The center system according to claim 34, wherein, when said edited map data has been transmitted, it is designed not to impose communication fee to the user.

36. The center system according to claim 32, wherein there is further provided a traffic control center for controlling traffic restriction and congestion information, said control means is designed to receive said traffic restriction and congestion information from said traffic control center, and to transfer said map data to said terminal together with said traffic restriction and congestion information.

37. The center system according to claim 32, wherein there is further provided monitoring means for monitoring communication status of said communication means, said control means is designed to change an amount of transfer of the map data to be distributed to said terminal according to the communication status monitored by said monitoring means.

38. The center system according to claim 37, wherein, when communication status is poor according to said monitoring means, the control means is designed to intermittently transfer the map data information to be distributed.

39. The center system according to claim 37, wherein, when the communication status is poor according to said monitoring means, the control means switches over the map to be distributed to a map for wider area or to transfer the data by deleting traffic restriction and congestion information.

40. A terminal, comprising:
   input means for inputting information,
   communication means for transmitting and receiving map data to and from a center system,
   map data storage means for storing the map data;
   format storage means for storing a format for editing and delivery of said map data; and
   control means for controlling said input means, said communication means, said map data storage means, and said format storage means,
   wherein said control means is designed to receive the map data from said center system via said communication means, to edit said received map data, and to transmit the edited map data by turning it to a predetermined format and to transmit it to said center system.

41. The terminal according to claim 40, wherein said map data is edited in the format selected from the format stored in said format storage means, and if it is a vector information, plotting is performed with points on a map displayed on the terminal screen by using said input means, and the data is managed in differential mode using the plotted information as dot series information of vector.

42. The terminal according to claim 40, wherein, when the edited map data is transmitted to said center system, said control means adds an identifier to specify the selected format.

43. The terminal according to claim 40, wherein, when the edited map data is transmitted to said center system, said control means can add a header for making the communication fee free.

44. A map data distribution system, having a center system and a terminal, wherein said center system comprises:
   a map database for storing a map data;
   communication means for transmitting arid receiving the map data to and from a terminal; and
   control means for picking up the map data to be distributed from said map database and for distributing the data to said terminal and for updating the map data in said map database according to the map data transmitted from said terminal; and
   said terminal comprises:
   input means for inputting information,
   communication means for transmitting and receiving map data to and from a center system,
   map data storage means for storing the map data;
   format storage means f or storing a format for editing and delivery of said map data; and control means for controlling said input means, said communication means, said map data storage means, and said format storage means,
   wherein said control means is designed to receive the map data from said center system via said communication means, to edit said received map data, and to transmit the edited map data by turning it to a predetermined format and to transmit it to said center system.

* * * * *

UNITED STATES PATENT AND TRADEMARK OFFICE
CERTIFICATE OF CORRECTION

| | | |
|---|---|---|
| PATENT NO. | : 7,161,503 B2 | Page 1 of 1 |
| APPLICATION NO. | : 10/485793 | |
| DATED | : January 9, 2007 | |
| INVENTOR(S) | : Takayanagi | |

It is certified that error appears in the above-identified patent and that said Letters Patent is hereby corrected as shown below:

*The following errors were noted in the Specifications:*
Column 12, line 3 – delete "1350°" and replace with "135 °";

*The following errors were noted in the Claims:*
Column 15, line 18 - delete "f or" and replace with --for--;
Column 18, line 21 - delete "f or" and replace with --for--;
Column 20, line 27 - delete "f or" and replace with --for--.

Signed and Sealed this

Twenty-fifth Day of September, 2007

JON W. DUDAS
*Director of the United States Patent and Trademark Office*